(12) United States Patent
Brandenburger et al.

(10) Patent No.: US 8,978,708 B2
(45) Date of Patent: Mar. 17, 2015

(54) TUBULAR LINER FOR THE REHABILITATION OF DEFECTIVE SEWERS WITH AN INTEGRAL LONGITUDINAL PULL STRAP AND REINFORCING LAYER

(71) Applicant: Brandenburger Patentverwertung GBR, Garmisch-Partenkirchen (DE)

(72) Inventors: Tim Brandenburger, Landau (DE); Philipp Bergmann, Landau (DE); Peter Duttenhoefer, Ilbesheim (DE)

(73) Assignee: Brandenburger Patentverwertung GBR, Landau (DE)

( * ) Notice: Subject to any disclaimer, the term of this patent is extended or adjusted under 35 U.S.C. 154(b) by 123 days.

(21) Appl. No.: 13/888,428

(22) Filed: May 7, 2013

(65) Prior Publication Data

US 2013/0291987 A1 Nov. 7, 2013

(30) Foreign Application Priority Data

May 7, 2012 (DE) .......................... 10 2012 008 770

(51) Int. Cl.
*F16L 55/18* (2006.01)
*F16L 55/165* (2006.01)

(52) U.S. Cl.
CPC ........... *F16L 55/165* (2013.01); *F16L 55/1656* (2013.01)
USPC ......... 138/98; 138/97; 405/150.1; 405/184.2; 428/36.91; 156/287; 156/294

(58) Field of Classification Search
USPC ......... 138/98, 97; 405/150.1, 184.2; 156/287, 156/294, 304.3, 308.4; 428/36.91
See application file for complete search history.

(56) References Cited

U.S. PATENT DOCUMENTS

| 5,186,987 A * | 2/1993 | Imoto et al. ........... 428/34.5 |
| 5,334,429 A * | 8/1994 | Imoto et al. ........... 428/36.2 |
| 5,411,060 A * | 5/1995 | Chandler ............... 138/98 |
| 5,628,345 A * | 5/1997 | Fisco .................. 138/98 |
| 5,698,056 A * | 12/1997 | Kamiyama et al. ...... 156/218 |
| 5,836,357 A * | 11/1998 | Kittson et al. .......... 138/98 |
| 5,857,494 A * | 1/1999 | Tsukamoto et al. ...... 138/140 |
| 5,873,391 A * | 2/1999 | Kittson et al. .......... 138/98 |
| 6,019,136 A * | 2/2000 | Walsh et al. ........... 138/98 |
| 6,679,966 B1 | 1/2004 | Brandenburger |
| 6,708,729 B1 * | 3/2004 | Smith .................. 138/98 |

(Continued)

FOREIGN PATENT DOCUMENTS

WO 00/73692 A1 12/2000

*Primary Examiner* — Patrick F Brinson
(74) *Attorney, Agent, or Firm* — Laurence A. Greenberg; Werner H. Stemer; Ralph E. Locher

(57) ABSTRACT

A tubular liner for rehabilitating sewers has a reinforcing layer being expandable in the circumferential direction and formed of fiber rovings and impregnated with a curable reactive resin. The tubular liner has an outer tubular film which encloses the reinforcing layer and is formed of a material that can be expanded radially. A longitudinal pull strap is provided and absorbs the tensile forces acting on the tubular liner when the tubular liner is inserted into the sewer. The tubular film has a laminated nonwoven layer on the side facing the reinforcing layer. The longitudinal pull strap is located between the nonwoven layer and the reinforcing layer and is in immediate contact with the outer side of the reinforcing layer and the nonwoven layer. The longitudinal pull strap has a width of less than 50% of a length of the outer circumference of the reinforcing layer.

13 Claims, 1 Drawing Sheet

(56) References Cited

U.S. PATENT DOCUMENTS

| | | | |
|---|---|---|---|
| 6,732,763 B2 * | 5/2004 | Williamson et al. | 138/98 |
| 6,923,217 B2 * | 8/2005 | Smith | 138/98 |
| 8,590,575 B2 * | 11/2013 | D'Hulster | 138/98 |
| 8,616,243 B2 * | 12/2013 | Kiest, Jr. | 138/98 |
| 2006/0151042 A1 * | 7/2006 | Stringfellow et al. | 138/125 |
| 2007/0113971 A1 * | 5/2007 | Driver et al. | 156/287 |
| 2009/0229696 A1 * | 9/2009 | Warren | 138/98 |

* cited by examiner

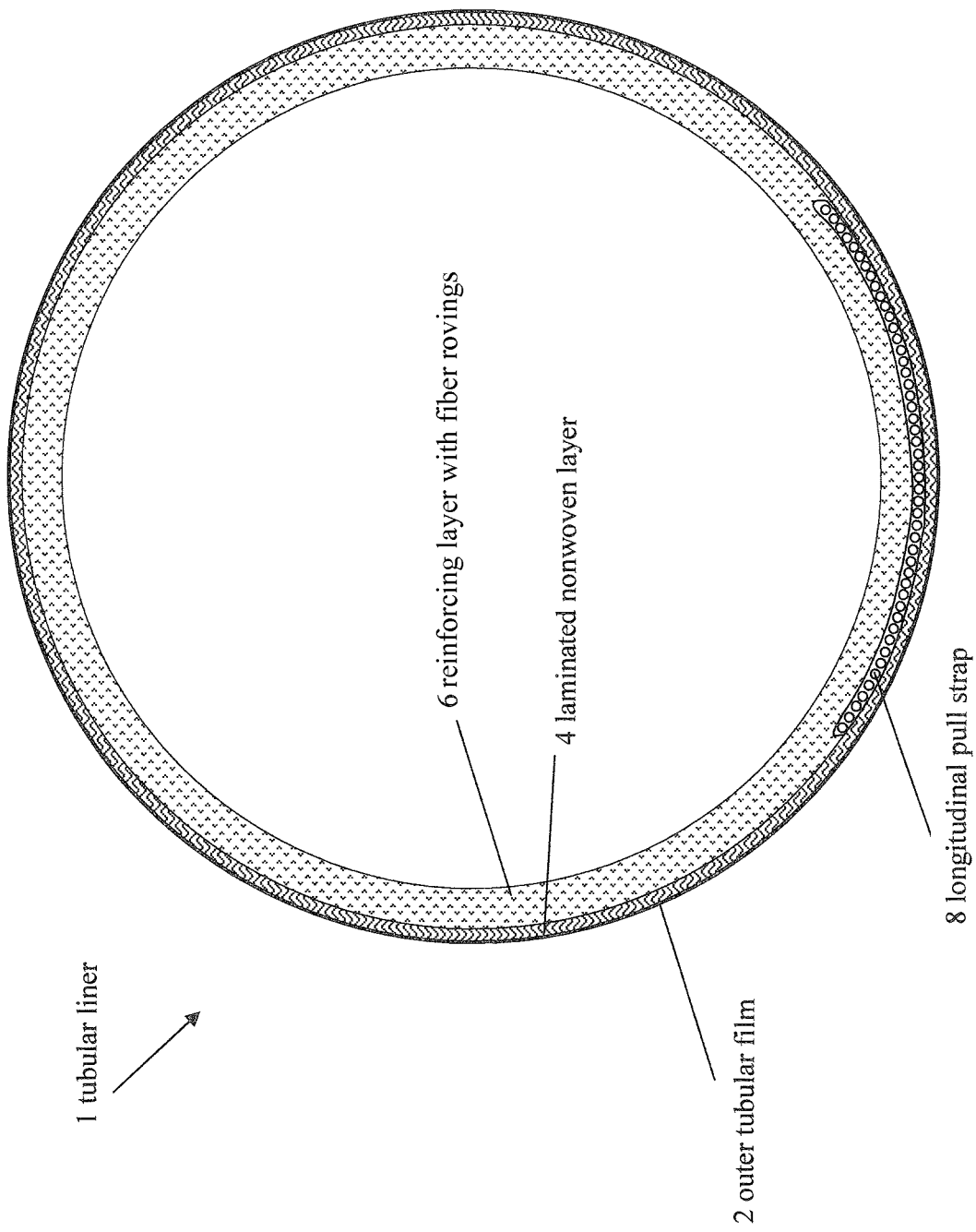

TUBULAR LINER FOR THE REHABILITATION OF DEFECTIVE SEWERS WITH AN INTEGRAL LONGITUDINAL PULL STRAP AND REINFORCING LAYER

CROSS-REFERENCE TO RELATED APPLICATION

This application claims the priority, under 35 U.S.C. §119, of German application DE 10 2012 008 770.5, filed May 7, 2012; the prior application is herewith incorporated by reference in its entirety.

BACKGROUND OF THE INVENTION

Field of the Invention

The invention relates to a tubular liner for the rehabilitation of defective sewers with an integral longitudinal pull strap and reinforcing layer.

In the field of trenchless rehabilitation of defective sewers, use is increasingly being made of tubular liners, called "inliners", which consist of a fiber material, in particular of a glass fiber fabric, which is impregnated with a liquid reactive resin that is cured by light from a radiation source after the tubular liner has been inserted into the pipeline and expanded by compressed air. Such a tubular liner and a method for manufacturing the tubular liner are disclosed, for instance, in international patent disclosure WO-A00/73692. The thus disclosed tubular liner contains an inner tubular film with a laminated nonwoven layer onto which the resin-impregnated fiber rovings are wound in an overlapping fashion on a winding mandrel. In order to protect the circumferentially expandable fiber tube manufactured in this fashion from being cured by the UV light contained in sunlight, prior to being transported to a construction site the fiber tube is enclosed by a lightproof outer tubular film which is continuously applied subsequent to the winding operation in the shape of two longitudinal sheets that are heat-fused to one another by their lateral edges.

The outer tubular film usually consists of a highly expandable lightproof film, for example a polyester film, which expands to the same extent as the fiber material when the fiber tube is expanded by compressed air inside the sewer that is being rehabilitated. As a result of the expansion, the circumference of the fiber tube sometimes increases by up to 10% of the original value, thus ensuring that the fiber tube can adapt within certain limits to varying sewer diameters.

In order to prevent a pulling apart of the individual windings of overlapping fiber rovings when such a tubular liner is inserted into a sewer, fiber rovings that absorb the sometimes significant tensile forces during the insertion of such a liner are arranged on the last applied reinforcing layer prior to the fusing of the smooth-walled lightproof outer tubular film during the manufacturing of the tubular liners. The longitudinal pull straps consist of a plurality of glass fibers oriented parallel with one another, or rovings.

Alternatively, after the winding of the tubular liner, the resin-impregnated fiber rovings are wrapped with an outer film which is only laminated with a nonwoven layer on its side facing the center of the tubular liner, in order to achieve an enhanced connection between the outer film and the fiber roving layer after the curing of the tubular liner. In this type of embodiment, the longitudinal pull straps are also only placed loosely on the resin-free outer side of the nonwoven-laminated film prior to arranging and fusing the lightproof outer tubular film around it.

Consequently, the longitudinal pull straps in tubular liners according to the prior art do not form a bond with the fiber roving layer after the curing of the respective liner, and thus merely increase the weight and the diameter of the tubular liner without improving the static strength of the cured tubular liner after insertion and curing of the same.

SUMMARY OF THE INVENTION

It is accordingly an object of the invention to provide a tubular liner for the rehabilitation of defective sewers with an integral longitudinal pull strap and a reinforcing layer which overcome the above-mentioned disadvantages of the prior art devices of this general type, which offers at the same weight a higher static strength after curing.

With the foregoing and other objects in view there is provided, in accordance with the invention a tubular liner for rehabilitation of a sewer. The tubular liner contains a reinforcing layer being expandable in a circumferential direction and having fiber rovings wound in an overlapping fashion and impregnated with a light-curable or heat-curable reactive resin. The reinforcing layer has an outer side and an outer circumference. An outer tubular film encloses the reinforcing layer and is formed from a material being expandable radially and impermeable to UV light. The outer tubular film has a laminated nonwoven layer on a side facing the reinforcing layer. At least one longitudinal pull strap is disposed between the reinforcing layer and the outer tubular film and absorbs tensile forces acting on the outer tubular liner when the outer tubular liner is inserted into the sewer. The longitudinal pull strap is a reactive-resin-impregnated woven tape disposed between the laminated nonwoven layer and the reinforcing layer and is in immediate contact with the outer side of the reinforcing layer and the laminated nonwoven layer. The longitudinal pull strap has a width of less than 50% of a length of the outer circumference of the reinforcing layer, such that, following an expansion of the outer tubular liner by compressed air and a curing of the reactive resin, a composite layer containing the fiber rovings, the longitudinal pull strap and the laminated nonwoven layer being created and protects the outer tubular liner against wear.

In accordance with an added feature of the invention, the longitudinal pull strap extends beyond a length of the reinforcing layer at both ends when viewed in an axial direction of the tubular liner and is formed of a single continuous section, formed of a glass fiber fabric.

In accordance with another feature of the invention, the longitudinal pull strap is disposed, with reference to the tubular liner inserted into the sewer, on an underside and also on an upper side of the reinforcing layer.

In accordance with an additional feature of the invention, the outer tubular film contains at least two sheets of a heat-fusible polymer material which extend in a longitudinal direction of the tubular liner and are fused or glued to one another along at least one axially extending longitudinal seam.

In accordance with another feature of the invention, the two sheets of the outer tubular film fused to one another are each connected to one another in a region of their nonwoven-laminated inner sides.

In accordance with another added feature of the invention, a light-permeable inner tubular film is disposed on an inner side of the reinforcing layer facing away from the longitudinal pull strap.

In accordance with a concomitant feature of the invention, the longitudinal pull strap has a thickness of 0.1 mm to 1 mm and the reinforcing layer has a total thickness of 3.5 mm to 4.5 mm and contains multiple layers of the fiber rovings.

Other features which are considered as characteristic for the invention are set forth in the appended claims.

Although the invention is described herein as embodied in a tubular liner for the rehabilitation of defective sewers with an integral longitudinal pull strap and a reinforcing layer, it is nevertheless not intended to be limited to the details shown or described, since various modifications and structural changes may be made therein without departing from the spirit of the invention and within the scope and range of equivalents of the claims.

The construction and method of operation of the invention, however, together with additional objects and advantages thereof will be best understood from the following description of specific embodiments.

BRIEF DESCRIPTION OF THE DRAWING

The single FIGURE of the drawing is a diagrammatic, sectional view of a tubular liner according to the invention.

DETAILED DESCRIPTION OF THE INVENTION

Referring now to the single FIGURE of the drawing in detail, there is shown, according to the invention, a tubular liner 1 for the rehabilitation of a sewer that contains a reinforcing layer 6 that can be expanded in the circumferential direction, and formed from fiber rovings, in particular glass fiber rovings, wound in an overlapping fashion and impregnated with a light-curable or heat-curable reactive resin. An outer tubular film 2 encloses the reinforcing layer 6 and is formed of a material that can be expanded radially and is, in particular, impermeable to UV light. At least one longitudinal pull strap 8 is arranged between the resin-impregnated reinforcing layer 6 and the outer tubular film 2 and absorbs the tensile forces acting on the tubular liner 1 when the tubular liner 1 is inserted into the sewer. The invention is characterized in that the outer tubular film 2 has a laminated nonwoven layer 4, in particular made of a heat-fusible polyester nonwoven, on the inner side facing the reinforcing layer 6, and in that the longitudinal pull strap 8 is a reactive-resin-impregnated woven tape which is located between the nonwoven layer and the reinforcing layer 6 and is in immediate contact with the outer side of the reinforcing layer 6 and the nonwoven layer. According to the invention, the longitudinal pull strap 8 has a width of less than 50%, preferably less than 33%, and particularly preferably between 20% and 30% of the length of the outer circumference of the reinforcing layer 6, such that, following the expansion of the tubular liner 1 by compressed air and the subsequent curing of the reactive resin, a composite layer containing fiber rovings, longitudinal pull strap and nonwoven layer is created, forms an integral part of the cured tubular liner and which effectively protects it against wear.

The invention offers the advantage that the resin-impregnated longitudinal pull strap 8, which is preferably made of a glass fiber fabric, during insertion adheres to the outer side of the reinforcing layer 6 by the resin and simultaneously also to the inner side of the outer tubular film 2, which is considerably rougher than a smooth-walled outer tubular film. This ensures that the wound reinforcing layer is not pulled apart during the insertion of the tubular liner 1, and additionally that the tensile forces are effectively into the outer tubular film 2, which by the nonwoven layer adheres significantly better to the longitudinal pull strap or straps 8. The longitudinal pull strap 8 or the longitudinal pull straps is or are preferably located on the underside of the reinforcing layer 6 in the region of the bed of the sewer being rehabilitated and also on the upper side of the reinforcing layer 6, respectively.

Subsequent to the curing of the tubular liner 1, which is preferably implemented by passing through a UV light source, the reinforcing layer 6, the longitudinal pull strap 8 and the outer tubular film 2 form a high-strength integral reinforcing layer due to the compressive forces acting on the tube walling in the region of the longitudinal pull strap 8 or straps during the curing process, its stability being the result of the reactive resin migrating from the fabric of the longitudinal pull strap and penetrating both into the outer side of the reinforcing layer 6 and into the nonwoven on the inner side of the outer tubular film 2. However, the remaining region of the tubular liner 1, which is generally exposed to a significantly lower mechanical stress during operation than the region in the sewer bed, contains no additional integral reinforcing layer, thus allowing an advantageous reduction in material costs.

In the preferred embodiment of the invention, the longitudinal pull strap 8 extends beyond the length of the reinforcing layer 6 at both ends when viewed in the axial direction of the tubular liner and contains a single continuous section or multiple sections sewn to one another, formed from in particular a glass fiber fabric. The longitudinal pull strap 8 is unrolled from a roll and laid onto the reinforcing layer 6 after the latter has been manufactured, and/or pressed onto the reinforcing layer 6 from below, prior to the outer tubular film being applied.

The outer tubular film 2 preferably contains one or multiple sheets of heat-fusible polymer material which extend in the longitudinal direction of the tubular liner 1, are unrolled from a roll in the same fashion as the longitudinal pull strap 8 and laid on the reinforcing layer 6, and the longitudinal pull strap 8 located in between, in the direction of advancement of the reinforcing layer 6, which is preferably manufactured continuously on a mandrel, and are subsequently fused or glued to one another laterally along one or multiple axially extending longitudinal seams.

In a further embodiment of the invention, the two sheets of the outer tubular film 2 fused to one another are each connected to one another in the region of their nonwoven-laminated inner sides, this preferably being carried out by a known heat fusing device, in particular with the simultaneous application of a pressing force which pushes together the wing-like overlapping sections of the sheets of film. In this fashion, the outer tubular film 2 with the required diameter can be cost-effectively manufactured continuously with high precision from roll stock.

In the preferred embodiment of the invention, the longitudinal pull strap 8 has a thickness of 0.1 mm to 1 mm, in particular 0.3 mm to 0.7 mm, particularly preferably 0.5 mm. The reinforcing layer 6, which is selected on the basis of the diameter of the tubular liner 1, can have a total thickness of 3.5 mm to 4.5 mm.

Lastly, the preferred embodiment of the invention provides that a light-permeable inner tubular film, which is preferably made from a styrene-impermeable polymer material, is located on the inner side of the reinforcing layer facing away from the longitudinal pull strap.

The invention claimed is:
1. A tubular liner for rehabilitation of a sewer, the tubular liner comprising:
   a reinforcing layer being expandable in a circumferential direction and having fiber rovings wound in an overlapping fashion and impregnated with a light-curable or heat-curable reactive resin, said reinforcing layer having an outer side and an outer circumference;

an outer tubular film enclosing said reinforcing layer and formed from a material being expandable radially and impermeable to UV light, said outer tubular film having a laminated nonwoven layer on a side facing said reinforcing layer; and at least one longitudinal pull strap disposed between said reinforcing layer and said outer tubular film and absorbing tensile forces acting on said outer tubular liner when said outer tubular liner is inserted into the sewer, said longitudinal pull strap being a reactive-resin-impregnated woven tape disposed between said laminated nonwoven layer and said reinforcing layer and being in immediate contact with said outer side of said reinforcing layer and said laminated nonwoven layer, said longitudinal pull strap having a width of less than 50% of a length of said outer circumference of said reinforcing layer, such that, following an expansion of said outer tubular liner by means of compressed air and a curing of said reactive resin, a composite layer containing said fiber rovings, said longitudinal pull strap and said laminated nonwoven layer is created and protects said outer tubular liner against wear.

2. The tubular liner according to claim 1, wherein said longitudinal pull strap extends beyond a length of said reinforcing layer at both ends when viewed in an axial direction of said tubular liner and is formed of a single continuous section, formed of a glass fiber fabric.

3. The tubular liner according to claim 2, wherein said longitudinal pull strap is disposed, with reference to said tubular liner inserted into the sewer, on an underside and also on an upper side of said reinforcing layer.

4. The tubular liner according to claim 1, wherein said outer tubular film contains at least two sheets of a heat-fusible polymer material which extend in a longitudinal direction of said tubular liner and are fused or glued to one another along at least one axially extending longitudinal seam.

5. The tubular liner according to claim 4, wherein said two sheets of said outer tubular film fused to one another are each connected to one another in a region of their nonwoven-laminated inner sides.

6. The tubular liner according to claim 1, further comprising a light-permeable inner tubular film disposed on an inner side of said reinforcing layer facing away from said longitudinal pull strap.

7. The tubular liner according to claim 1, wherein said longitudinal pull strap has a thickness of 0.1 mm to 1 mm and said reinforcing layer has a total thickness of 3.5 mm to 4.5 mm and contains multiple layers of said fiber rovings.

8. The tubular liner according to claim 1, wherein said width of said longitudinal pull strap is less than 33% of said length of said outer circumference of said reinforcing layer.

9. The tubular liner according to claim 1, wherein said width of said longitudinal pull strap is between 20% and 30% of said length of said outer circumference of said reinforcing layer.

10. The tubular liner according to claim 1, wherein said longitudinal pull strap extends beyond a length of said reinforcing layer at both ends when viewed in an axial direction of said tubular liner and is formed of multiple sections sewn to one another, formed of a glass fiber fabric.

11. The tubular liner according to claim 1, wherein said longitudinal pull strap has a thickness of 0.3 mm to 0.7 mm and said reinforcing layer has a total thickness of 3.5 mm to 4.5 mm and contains multiple layers of glass fiber rovings, wound over one another.

12. The tubular liner according to claim 1, wherein said longitudinal pull strap has a thickness of 0.5 mm, and said reinforcing layer has a total thickness of 3.5 mm to 4.5 mm and contains multiple layers of glass fiber rovings wound over one another.

13. The tubular liner according to claim 7, wherein said fiber rovings are glass fiber rovings, wound over one another.

* * * * *